June 20, 1967 F. A. OLIVER 3,327,313

MULTIPLE HEAD UNIT

Filed Aug. 23, 1955

INVENTOR
Francis A. Oliver

By Carl Beust
Louis A. Kline
John J. Matlago
His Attorneys.

United States Patent Office 3,327,313

Patented June 20, 1967

3,327,313

MULTIPLE HEAD UNIT

Francis A. Oliver, Azusa, Calif., assignor to The National Cash Register Company, Dayton, Ohio, a corporation of Maryland Filed Aug. 23, 1955, Ser. No. 530,014

11 Claims. (Cl. 346—74)

This invention relates to magnetic transducers and more particularly to a highly precise and readily interchangeable multiple head mounting unit for magnetic storage systems.

In the electronic computer art, magnetic tapes are used for storing coded information arranged so that a particular combination of signals, simultaneously recorded on various channels thereof, may represent numbers, letters, operational instructions or other information. Since it is the combination of signals available to the sensing device at any one time which determines the significance of this information in order to ensure that the signals of a combination are reproduced from the tape accurately and simultaneously, the relative timewise positions of the heads sensing the signals on a tape should be the same as the relative timewise positions of the heads at the time of recording the signals. The foregoing problem is particularly acute when a library of tapes is desired, inasmuch as the tape unit provided for recording a particular tape may not be the same tape unit utilized for reading the tape.

It is accordingly one of the objects of this invention to provide a head mounting unit in which a plurality of magnetic heads may be precisely spaced and rigidly maintained in position.

Another object of this invention is to provide multiple magnetic head mounting units having such an inherent degree of exactness that any of the mounting units may be interchanged with the others without causing distorted signals to be read from the tape.

It is still another object of this invention to provide a novel method for producing a highly precise and compact multiple channel head unit which enables one-piece shields to be positioned between adjacent heads to reduce cross-talk.

Briefly, the invention comprises a pair of metallic housings, each providing a plurality of spaced slots in which C-shaped mu-metal sections, each corresponding to half the core of a magnetic head, are inserted and mechanically held in position. The mu-metal core sections are so spaced in each housing that they can be mated to form the core of a magnetic head when a pair of housings are secured together. Situated between the slots for the mu-metal core sections are additional slots for metal shields which, in effect, bridge the housings together when assembled.

Since the cores and shields are rigidly and mechanically held in the housing, each half-unit can be separately potted by means of a suitable thermosetting plastic to protect the heads without the possibility of any subsequent spacing distortions caused by structural changes in the plastic due to temperature or aging effects. The inner surfaces of the half-units are then polished smooth and flat so that two halves can be fitted together accurately. It is to be noted that this half-unit type construction allows the gaps of the several heads to be precisely aligned since it is possible to lap all core gaps simultaneously. Furthermore, this type of construction renders alignment of the head gaps with respect to the channels on the magnetic tape a simple procedure inasmuch as the outer surfaces of the metallic housings can be precisely machined parallel with the gaps of the heads, and to the same dimensions.

The invention can be more fully understood by reference to the ensuing description of the attached drawings in which.

Figures 1, 2, 3, 4, 5, 6:
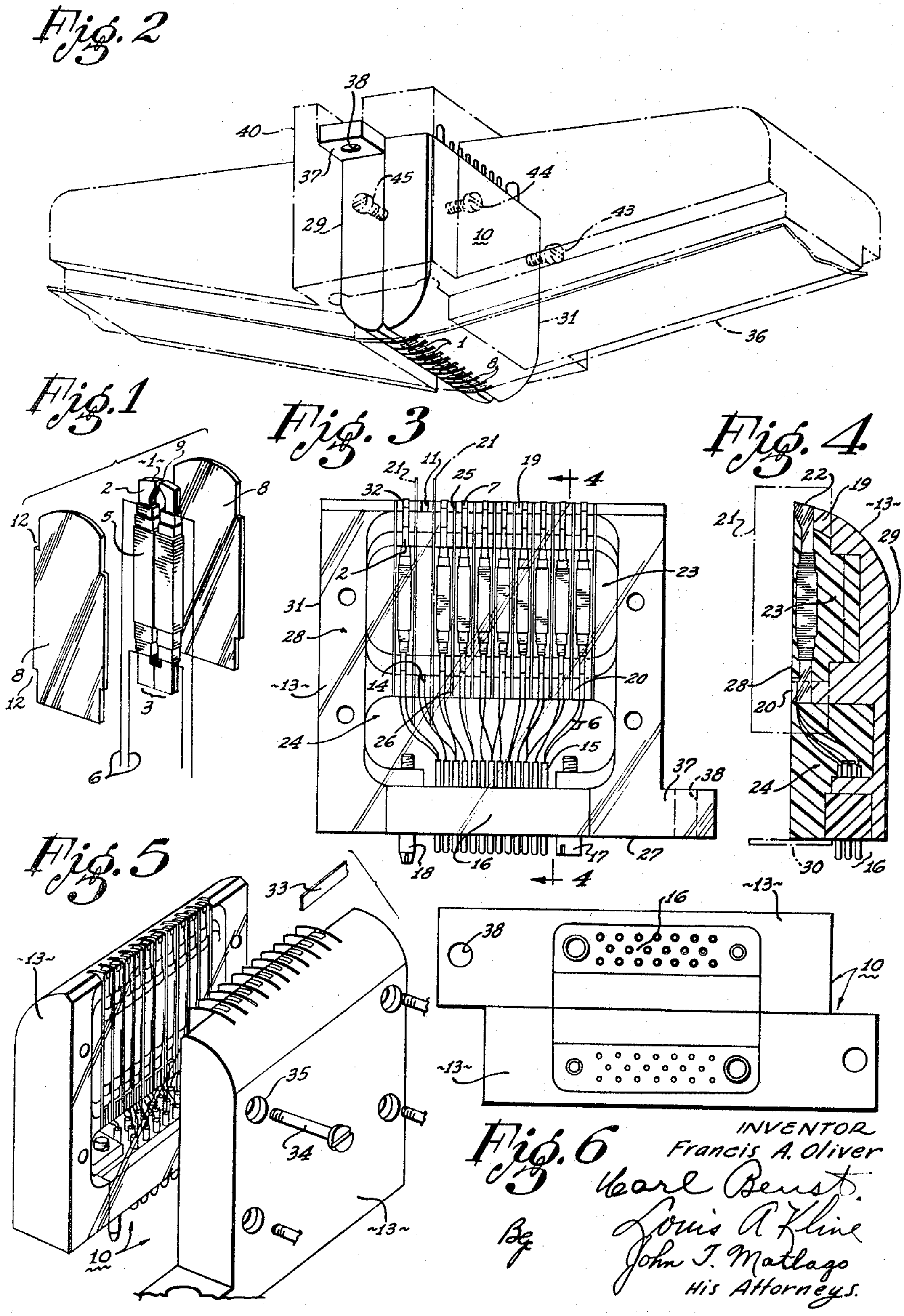
FIG. 1 is a perspective view of a magnetic head and shielding as used in the invention.
FIG. 2 shows the head mounting unit of the present invention as positioned in a tape unit.
FIG. 3 is a view of the inner face of an assembled housing.
FIG. 4 is a cross-sectional view taken along line 4—4 in FIG. 3.
FIG. 5 is a perspective view showing how a pair of housing assemblies are fitted together to form a complete head mounting unit.
FIG. 6 is a view of the terminal end of the assembled head mounting unit.

Referring first to FIG. 1, a transducing head 1, as utilized in a preferred embodiment of the invention, is shown. The head 1 comprises a laminated core 3 made from a suitable high permeability metal, e.g., mu-metal. Core 3 is made in two identical sections, such as core section 2, each provided with a winding, such as winding 5, having a suitable number of turns. The end connections 6 of the windings 5 are extended so as to enable the head 1 to be connected to a suitable electrical connector.

The mounting unit 10 of the present invention, as shown in FIG. 2, combines ten such transducing head assemblies into a single holder, each head 1 being shielded from the adjacent ones by means of a one-piece mu-metal shield 8, as shown in FIG. 1. It is to be noted that these shields 8 are generally shaped to agree with the contour of the core 3 and extend flush with the record gap 9 so as to effectively prevent the leakage of flux from the gap of one head into the adjacent head when assembled in mounting unit 10.

FIG. 3 is a view of the inner face of a housing 13, two of which when mated together form the mounting unit 10. The housings 13 are preferably made of aluminum and each is milled out to provide an upper chamber 23 and a lower chamber 24. Core sections 2 are held in position, side by side, at equally spaced intervals within the upper chamber 23 by insertion in respective precisely machined pairs of slots 11 and 14, equally spaced along upper wall 19 and central wall 20, respectively, of housing 13. Thus each core section 2 is firmly supported at both ends, thereby providing a rugged and rigid structure. It is to be noted that core sections 2 are aligned in housing 13 so that .008 inch of core face 7 extends out from the radius 22 of upper wall 19 of housing 13. An electrical connector 16 is affixed to the base of housing 13 by means of screws 17 and 18. The end connections 6 of the core windings are connected to appropriate terminals 15 on electrical connector 16.

The extent to which chamber 23 is potted is shown in FIG. 4, which is a cross-sectional view taken along line 4—4 in FIG. 3. In order to prepare each housing for potting, a series of dummy shields 21 are greased with silicone and placed into position into slots 25 and 26 spaced intermediate the slots 11 and 14 in the upper wall 19 and central wall 20, respectively, of housing 13. A metal stop 30 is siliconed and held flush with the surface 27 of housing 13, and the outside surface of electrical connector 16, for the purpose of retaining the plastic resin in lower chamber 24 during the potting procedure.

The epoxy resin used for potting is poured into chambers 23 and 24 of housing 13 such that the resin runs well under and about the cores. It is to be noted that if the resin is allowed to stand a few minutes before pouring, most of the bubbles can be skimmed off. The housing assembly is then placed in a vacuum oven and released several times or until no more large bubbles appear in the resin, and the housing is then removed and allowed to set at room temperature for the resin jell cycle prior to being placed in a cure oven. After being removed from the cure oven and allowed to cool to room temperature, the dummy shields 21 are then removed from the housing 13. The excess (.008 inch) core material is next removed from the radius 22 of the housing 13 (see FIG. 4). Thereafter the entire inner surface 28, including that of housing 13 as well as the plastic surface, is ground true and flat. Similarly, back surface 29 of housing 13 is ground to a fixed dimension, parallel to polished inner surface 28, and side surface 31 is ground to a fixed dimension parallel to the first core section slot 32 in upper wall 19.

Two housing assemblies of the type just described in conjunction with FIGS. 3 and 4 are mated and held together, as shown in the perspective view comprising FIG. 5, to provide the completed unit. The first step in this assembly is to attach a shim 33 of non-magnetic material to the face of upper wall 19 to provide a gap for the cores. Shim 33, which is on the order of .00035 inch thickness, is cut longer and wider than necessary and is coated on one side with a suitable adhesive before being placed in position. The housings are then assembled together (leaving out shields 8), and heat, such as from a hot soldering iron, is applied to the entire length of the radius 22, thereby causing the coated side of shim 33 to adhere to the upper wall 19 of one of the housings. The housings 13 are then separated and the excess portions of shim 33, including the portions which cover the slots 25, are then removed with an appropriate tool in order to leave sufficient clearance for insertion of the mu-metal shields 8. It should be noted that the thickness of shim 33 is small enough, e.g., .00035 inch, to be negligible in fitting the two housings 13 together. To assemble the housings 13, one side of the shields 8 is inserted into slots 25 and 26 of one of the housings and then finally the other housing is mated with the first such that the other sides of shields 8 are inserted into corresponding slots 25 and 26 of the other housing. The corners 12 of the shields 8 are notched so that the extended portions of the sides formed fit within the walls of chamber 23 in housing 13. This positions the shields and retains them in the housing. It should be noted that the arrangement whereby a one-piece shield 8 is provided on each side of the heads 1 in mounting unit 10 is much more effective in reducing the cross-talk between the heads than if the shields 8 were split and secured in each of the housings 13 in a manner similar to the cores. After being assembled in this manner, the two housings are then secured together by means of four bolts 34, inserted through holes 35 drilled in the corners of each housing 13, thus providing a compact, rigid, and highly precise mounting unit.

It is to be noted that each housing 13 holds an independent assembly and in asmuch as it is of symmetrical construction, except for the electrical connectors, any two such housing assemblies can be joined together in the manner just described in order to form a complete multiple channel head unit.

The perspective view of the multiple head mounting unit in FIG. 2 shows it positioned in a magnetic tape unit. Each housing 13 is provided with a flange 37 having a hole 38 drilled therein. The mounting unit 10 is thus held into place in holder 40 by means of these flanges and also by means of positioning screws 43, 44, and 45 which serve to urge the precisely machined back surface 29 and side surface 31 of the housing 13 against the likewise precisely machined inner sides of holder 40.

It is to be noted that other than tightening the positioning screws 43, 44, and 45, no further adjustment is necessary in order to bring the multiple head mounting unit 10 in proper orientation with respect to the magnetic tape 36 positioned on the under side of the holder 40 of the tape unit, as shown in FIG. 2. Thus it is apparent that the multiple head mounting unit 10 of the present invention is highly flexible, i.e., such units can be interchanged as well as the record medium used therewith without appreciable signal distortion resulting therefrom.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A multiple magnetic transducer head unit comprising, in combination: first and second housing members having mutually opposed confronting faces, said housing members each having a plurality of substantially flat-sided thin projections disposed substantially perpendicularly of the confronting face thereof; means including a plurality of magnetic transducing head assemblies, each assembly thereof comprising first and second transducer sections, the first sections of said head assemblies being affixed each between a respective pair of said projections in the first of said housing members and the second sections of said head assemblies being affixed each between a respective pair of said projections in the second of said housing members and each of said first transducer sections having edge faces lapped coplanar with the confronting face of said first member and each of said second sections having edge faces lapped coplanar with the confronting face of said second member; means securing said housing members together in face to face relationship with respective ones of said first transducer sections opposite to and cooperative with corresponding ones of said second transducer sections; a plurality of magnetic shields each positioned between a respective pair of said transducing head assemblies and each extending between a pair of projections of said first housing member and between a pair of projections of said second housing member and transversely across the planes of the contacting faces of said members; and means providing magnetic gaps between opposite edge faces of respective cooperating first and second transducer sections; at least one of said first and second housing members providing an exposed surface precisely finished with respect to its respective contacting face, whereby to provide a readily accessible exposed positioning surface for said unit having a precise relationship with respect to said magnetic gaps.

2. A multiple magnetic transducer head unit according to claim 1, wherein said exposed surface is precisely finished parallel to the contacting face of its respective housing member, and wherein an additional exposed precisely finished surface is provided perpendicular thereto.

3. A multiple magnetic transducer head unit comprising, in combination: first and second metal housing members having mutually opposed confronting faces, said housing members each having a plurality of substantially flat-sided thin projections disposed substantially perpendicularly of the confronting face thereof; means including a plurality of magnetic transducing head assemblies, each assembly thereof comprising first and second transducer sections, the first sections of said head assemblies being affixed each between a respective pair of said projections in the first of said housing members and the second sections of said head assemblies being affixed each between a respective pair of said projections in the second of said housing members and each of said first transducer sections having edge faces lapped coplanar with the confronting face of said first member and each of said second sections having edge faces lapped coplanar with the confronting face of said second member, the confronting face on at least one of said housing members extending beyond the confronting face of the other housing member, means securing said housing members together in face to face relationship with respective ones of said first transducer sections opposite to and cooperative with corresponding ones of said second transducer sections; a plurality of magnetic shields each positioned between a respective pair of said transducing head assemblies and each extending between a pair of projections of said first housing member and between a pair of projections of said second housing member and transversely across the planes of the contacting faces of said members; and means providing magnetic gaps between opposite edge faces of respective cooperating first and second transducer sections.

4. A multichannel magnetic transducer head unit comprising a series of individual magnetic heads, each of said individual heads comprising opposite pole pieces presenting confronting pole tips on opposite sides of a transducing gap, a bracket supporting said individual heads in side-by-side relation with their respective pole tips coplanar and their transducing gaps aligned, said bracket presenting at the ends of the series of heads first metal faces lapped coplanar with the pole tips at one side of the aligned transducing gaps and second metal faces abutting said first metal faces and lapped coplanar with the pole tips at the other side of the aligned transducing gaps, each of said faces providing a surface area which is very much greater than the area of a pole tip, and a plurality of magnetic shield members disposed in said bracket so as to alternate with said heads, said shield members and said heads having edges terminating in a common surface in the vicinity of said gap, said bracket enclosing substantially all portions of said heads and said shield members except for those edges in said common surface, the surface of the bracket in the vicinity of said common surface also conforming thereto so as to provide a smooth receiving surface, said bracket also having at least one exposed reference surface precisely finished with reference to one of said first and second faces so as to provide a precise reference of said transducing gap.

5. A multichannel magnetic transducer head unit comprising a series of individual magnetic heads, each of said individual heads comprising opposite pole pieces presenting confronting pole tips on opposite sides of a transducing gap, a bracket supporting said individual heads in side-by-side relation with their respective pole tips coplanar and their transducing gaps aligned, said bracket presenting at the ends of the series of heads first metal faces lapped coplanar with the pole tips at one side of the aligned transducing gaps and second metal faces abutting said first metal faces and lapped coplanar with the pole tips at the other side of the aligned transducing gaps, each of said first and second faces providing a surface area which is very much greater than the area of a pole tip and one of said first and second faces extending beyond the other so as to provide an exposed surface coplanar with the pole tips at one side of said transducing gaps, and a plurality of magnetic shield members disposed in said bracket so as to alternate with said heads, said shield members and said heads having edges terminating in a common surface in the vicinity of said gap, said bracket enclosing substantially all portions of said heads and said shield members except for those edges in said common surface, the surface of the bracket in the vicinity of said common surface also conforming thereto so as to provide a smooth receiving surface.

6. Magnetic transducer means comprising: support means having at least one precisely finished substantially planar surface; magnetic head means, comprising first and second housing members and a plurality of magnetic heads supported by and held in spaced relationship each relative to another by the housing members, each of the magnetic heads having portions defining a magnetic gap and the said heads being supported with respective sides of said magnetic gaps in alignment and coplanar, at least one of said housing members comprising a precisely finished substantially planar face which is lapped coplanar with a respective side of said aligned magnetic gaps and a precisely finished substantially planar surface having a precise predetermined relation with respect to said face; and means for securing said magnetic head means in said support means with the said precisely finished substantially planar surface of the said one of said housing members in confronting contact with the said precisely finished substantially planar surface of the said support means, whereby the said gaps are accurately positioned relative to the said planar surface of the said support means.

7. Magnetic transducer means as defined by claim 6, said support means being constructed to provide a second precisely finished substantially planar surface disposed in a direction different from said one such surface, and said housing members being constructed to provide another precisely finished substantially planar face having a precise predetermined relation with respect to said face of said housing members and adapted to cooperate with said second precisely finished substantially planar surface of said support means, whereby said magnetic head means may be precisely positioned spatially in said support means in two different directions.

8. A magnetic transducer head unit for operation in transducing equipment having at least one reference surface element, comprising a plurality of magnetic transducer heads each having opposite pole pieces presenting confronting cooperating pole tips on opposite sides of a transducing gap, the pole tips on at least one side of said gap defining coplanar pole faces, and a mounting bracket within which said transducer heads are mounted for supporting said heads in said transducing equipment, said mounting bracket having at least one planar face lapped coplanar with the plane of said pole faces, and an external reference surface means provided on said mounting bracket and located in a predetermined precise relation to said one planar face and cooperable with said reference surface element on said transducing equipment to accurately align said transducing gap in said transducing equipment.

9. A magnetic transducer head unit as set forth in claim 8, further characterized by said mounting bracket providing two distinct external reference surfaces located in predetermined precise relationships with the plane of said one planar face.

10. A magnetic transducer head unit comprising a plurality of magnetic heads each made up of two generally C-shaped pole pieces positioned in opposed confronting relationship and presenting confronting lapped pole tips on opposite sides of a narrow transducing gap, and a two-piece bracket comprising a first housing member receiving pole pieces on one side of said gap and a second housing member receiving pole pieces on the other side of said gap, each of said housing members providing, at either end of the head, faces lapped coplanar with the pole tips of the respective pole pieces, the lapped face on at least one of said housing members projecting beyond the end of the other housing member.

11. A multichannel magnetic transducer head unit for operation in transducing equipment having a head-unit-locating reference surface, comprising first and second housing members, each of said housing members having coplanar lapped faces at the ends thereof, a first series of generally C-shaped magnetic pole pieces supported by said first housing member and terminating in pole tips lapped coplanar with said lapped faces on the first housing member, a second series of generally C-shaped magnetic pole pieces supported by said second housing member and terminating in pole tips lapped coplanar with said lapped faces on the second housing member, with housing members having their respective lapped face abutting against each other to position the pole tips of said first series of pole pieces in confronting relation individually to the respective pole tips of said second series of pole pieces so that the confronting pole pieces form individual magnetic heads with their transducing gaps in precise alignment, and an external locating surface on said first housing member precisely located in predetermined relation to the coplanar lapped faces of one of said housing members and cooperable with the head-unit-locating surface on the transducing equipment to precisely locate the gaps relative to the equipment.

References Cited

UNITED STATES PATENTS

| | | | |
|---|---|---|---|
| 2,618,709 | 11/1952 | Eckert et al. | 179—100.2 |
| 2,732,275 | 1/1956 | MacNeill | 346—74 |
| 2,751,440 | 6/1956 | De Turk et al. | 179—100.2 |
| 2,756,280 | 7/1956 | Rettinger | 179—100.2 |
| 2,769,036 | 10/1956 | Selsted | 179—100.2 |
| 2,769,866 | 11/1956 | Kornei | 179—100.2 |
| 2,785,232 | 3/1957 | Camras | 179—100.2 |
| 2,835,742 | 5/1958 | Moehring et al. | 179—100.2 |
| 2,888,522 | 5/1959 | McCutchen et al. | 179—100.2 |
| 2,921,143 | 1/1960 | Selsted et al. | 179—100.2 |
| 2,928,907 | 3/1960 | Lubkin | 179—100.2 |

OTHER REFERENCES

Pages 34, 51 and 52, August 1953, Singer and Rettinger, "Multiple-Track Magnetic Heads," in Audio Engineering.

BERNARD KONICK, *Primary Examiner.*

NEWTON N. LOVEWELL, *Examiner.*

L. M. ANDRUS, R. H. ROSE, H. W. HERMANN, A. L. BRODY, T. W. FEARS, *Assistant Examiners.*